United States Patent [19]

Kawahata

[11] Patent Number: 5,745,809
[45] Date of Patent: Apr. 28, 1998

[54] CAMERA WITH CORRESPONDINGLY SHAPED OPERATION MEMBERS AND DISPLAY AREAS

[75] Inventor: Nobuya Kawahata, Yokosuka, Japan

[73] Assignee: Nikon Corporation, Tokyo, Japan

[21] Appl. No.: 709,114

[22] Filed: Sep. 6, 1996

Related U.S. Application Data

[63] Continuation of Ser. No. 357,197, Dec. 13, 1994, abandoned.

[30] Foreign Application Priority Data

Dec. 16, 1993 [JP] Japan ............................ 5-317029
Dec. 27, 1993 [JP] Japan ............................ 5-330458

[51] Int. Cl.$^6$ ..................... G03B 17/18; G03B 17/00
[52] U.S. Cl. ............... 396/287; 396/291; 396/292; 396/299; 396/543
[58] Field of Search ................. 354/289.1, 289.12, 354/474, 475; 200/5 R, 5 A, 308, 310, 312; 345/168; 434/227–233; 396/281, 287, 291, 292, 297, 299, 439, 543

[56] References Cited

U.S. PATENT DOCUMENTS

| | | | |
|---|---|---|---|
| 4,286,849 | 9/1981 | Uchidoi et al. | 354/289.1 |
| 4,483,601 | 11/1984 | Sekida et al. | 354/288 |
| 4,529,291 | 7/1985 | Mizogui | 354/443 |
| 4,687,308 | 8/1987 | Someya | 354/82 |
| 4,707,101 | 11/1987 | Akabane et al. | 354/289.1 |
| 4,837,596 | 6/1989 | Kawamura | 354/442 |

FOREIGN PATENT DOCUMENTS

| | | |
|---|---|---|
| 2-216135 | 8/1990 | Japan. |
| 3-231728 | 10/1991 | Japan. |
| 5-203032 | 8/1993 | Japan. |
| 5-216106 | 8/1993 | Japan. |

*Primary Examiner*—Eddie C. Lee

[57] ABSTRACT

In a camera for displaying a plurality of control contents such as set values and functions controlled by a plurality of operation members on an LCD device, there are provided a plurality of display areas which constitute the LCD device and are formed by dividing the LCD device so as to correspond to the respective control contents of the operation members. An operation section is constituted of the operation members and disposed such that the divided shape of the display areas is the same as, or similar to, a divided shape of the operation section constituted of the operation members. According to a preferred embodiment, in a camera for displaying a plurality of control contents such as set values and functions controlled by a plurality of operation members on an LCD device, there are provided a plurality of display areas which constitute the LCD device and are formed by dividing the LCD device so as to correspond to the respective control contents of the operation members. An operation section is constituted of the operation members disposed such that each shape of the operation members is added to the shape of a corresponding one of the display areas to be predetermined shape.

10 Claims, 5 Drawing Sheets

CAMERA WITH CORRESPONDINGLY SHAPED OPERATION MEMBERS AND DISPLAY AREAS

This application is a continuation of application No. 08/357,197, filed Dec. 13, 1994, now abandoned.

BACKGROUND OF THE INVENTION

1. Field of the Invention

The present invention relates to a camera having an LCD device.

2. Related Background Art

In recent cameras, to display control contents on an LCD device is carried out popularly. And, with human engineering consideration, an operation section is provided on an easily operable portion and a display section is provided on an easily observable portion. Thus, easy handling of these portions is taken into consideration first, so that the operation section and the display section are liable to be disposed apart from each other.

Also, in recent cameras, in order to satisfy customers' demands, their specifications keep increasing. As a result, the number of operation buttons provided on the operation section are increasing. Therefore, when the operation section and the display section are separated, it becomes difficult to make the control contents operated in the operation section correspond to the control contents displayed on the display section. For its countermeasure, there have been proposed cameras in which an operation section is disposed in the vicinity of the display section, operation buttons in the operation section are pigmented with different colors, and areas in the display section are pigmented with the colors identical to the respectively corresponding operation buttons.

In the above prior art, as a result of giving priority to operability of the operation section, the display section is disposed so as to be apart from the operation section. Therefore, in order to reduce operational mistakes, the positions of the operation buttons are checked each time the control contents displayed on the display section are changed. However, it cannot be said that the operability is good. For example, while checking the positions of the operation buttons, a picture-taking chance might be lost.

Also, when the operation section is disposed in the vicinity of the display section, its operability is limited from the viewpoint of human engineering. Further, although the operation buttons in the operation section are pigmented with different colors and the areas in the display section are pigmented with the identical colors to the respectively corresponding operation buttons, it has no meaning to color-blind photographers.

SUMMARY OF THE INVENTION

It is an object of the present invention to provide a camera capable of changing contents displayed on an LCD device via an operation section promptly and surely.

In order to achieve the above object, according to a first aspect of the present invention, in a camera for displaying a plurality of control contents such as set values and functions controlled by a plurality of operation members on an LCD device, there are provided a plurality of display areas which constitute the LCD device and are formed by dividing the LCD device so as to correspond to the respective control contents of the operation members, and an operation section constituted of the operation members and disposed such that the divided shape of the display areas is the same as or similar to a divided shape of the operation section constituted of the operation members. Therefore, the relationship between the operation section and the display section can be grasped easily by the user, so that the user can operate the camera speedily and surely.

Preferably, the respective operation members are operation buttons and respective shapes of upper surfaces of the operation buttons are identical to shapes of upper surfaces of the display areas.

Preferably, at least one of the display areas is subdivided to have a plurality of sub-areas.

Preferably, at least one of the display areas displays each of the functions of the sub-areas in enlarged size.

Also, when setting a selected function in one of the sub-areas, the sub-area including the selected function is desirably flickered.

Further, when setting a selected function in one of the sub-areas, the sub-area including the selected function is indicated by an index.

The operation buttons are a user custom set button for selecting one of a plurality of menus of a user custom, an AF switching button for switching the AF functions, a function selecting button for selecting, when each of said menus of the user custom are subdivided into sub-menus, a desired function in each of the sub-menus of the selected menu, and a set value and function content selecting button for setting the set value and function of each of the selected functions.

The display areas are a user custom display area for displaying selected one of a plurality of menus of a user custom, an AF function content display area for displaying one of the AF function contents, a menu function display area for displaying, when each of the menus of the user custom are subdivided into sub-menus, the functions of each of the sub-menus of the selected menu, and a set value and function content display area for displaying the set value or function content of a selected function.

Further, each of the operating members may be constituted of a slide groove and a slide lever disposed slidably in said slide groove. In that case, the shape of each of upper surfaces of said respective slide grooves is the same as that of corresponding one of said display areas.

According to a second aspect of the present invention, in a camera for displaying a plurality of control contents such as set values and functions controlled by a plurality of operation members on an LCD device, there are provided a plurality of display areas which constitute the LCD device and are formed by dividing the LCD device so as to correspond to the respective control contents of the operation members, and an operation section constituted of the operation members disposed such that each shape of the operation members is added to the shape of corresponding one of the display areas to be a predetermined shape. Therefore, the relationship between the operation section and the display section can be grasped easily by the user, so that the user can operate the camera speedily and surely.

Preferably, the operation members are constituted of first operation members for selecting the functions and second operation members for setting the set values and/or the functions.

Preferably, the first operation members are disposed in a desired position of the outer surface of the camera body of the camera and the second operation members are disposed in the vicinity of the display areas of the LCD device.

Preferably, the first operation members include an exposure correcting button for carrying out exposure correction, an exposure mode selecting mode for selecting an exposure mode, a film speed setting button for setting a film speed and a film feeding mode button for selecting a film feeding mode, and the second operation members include a first electronic dial for setting an exposure correction value and the exposure mode and a second electronic dial for setting the film speed and the film feeding mode.

Preferably, the display areas are a first display area for displaying an exposure correction indication, an exposure mode and an F-number and a second display area for displaying a film speed, a film feeding mode and a shutter speed, and a third display area for displaying the other functions.

The above and other objects, features and advantages of the present invention are explained hereinafter and may be better understood by reference to the drawings and the descriptive matter which follows.

DESCRIPTION OF THE PREFERRED EMBODIMENTS

Figure 1:
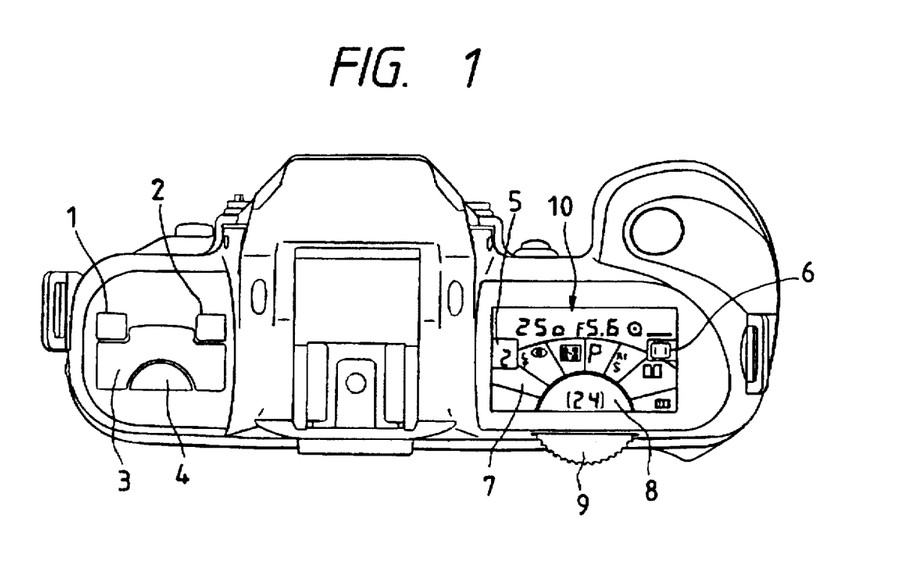
FIG. 1 is a top plan view of a camera according to a first embodiment of the present invention.
Figure 2:
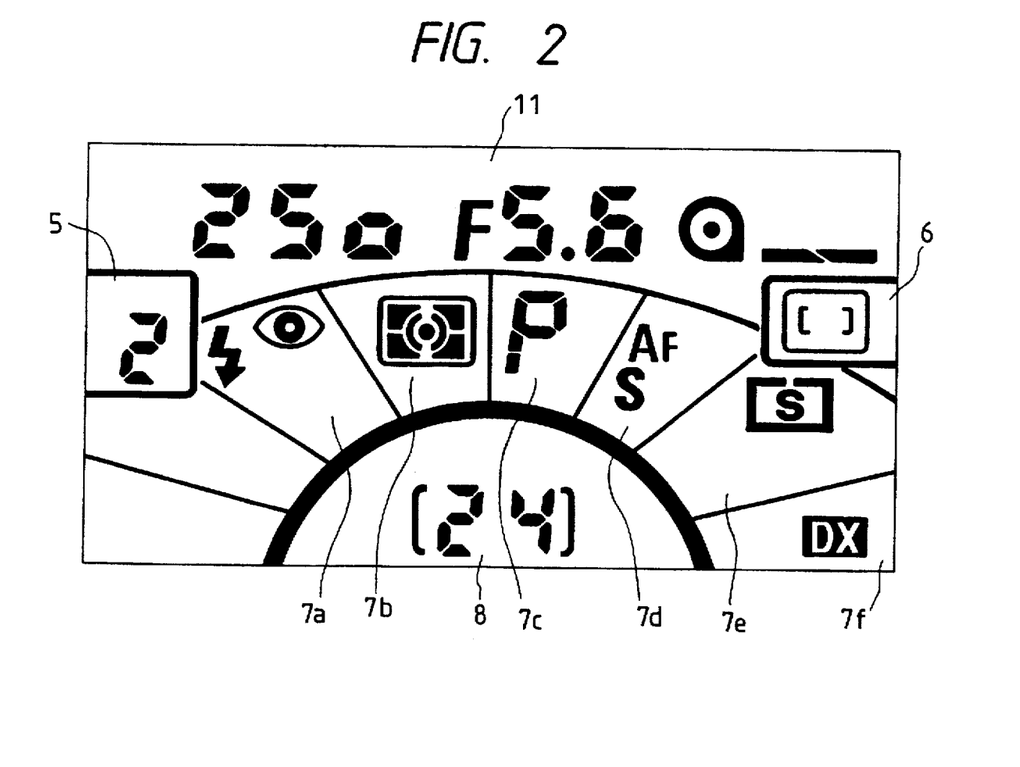
FIG. 2 is an enlarged diagram showing the state of the display areas in FIG. 1 in a normal lighting condition.
Figure 3:
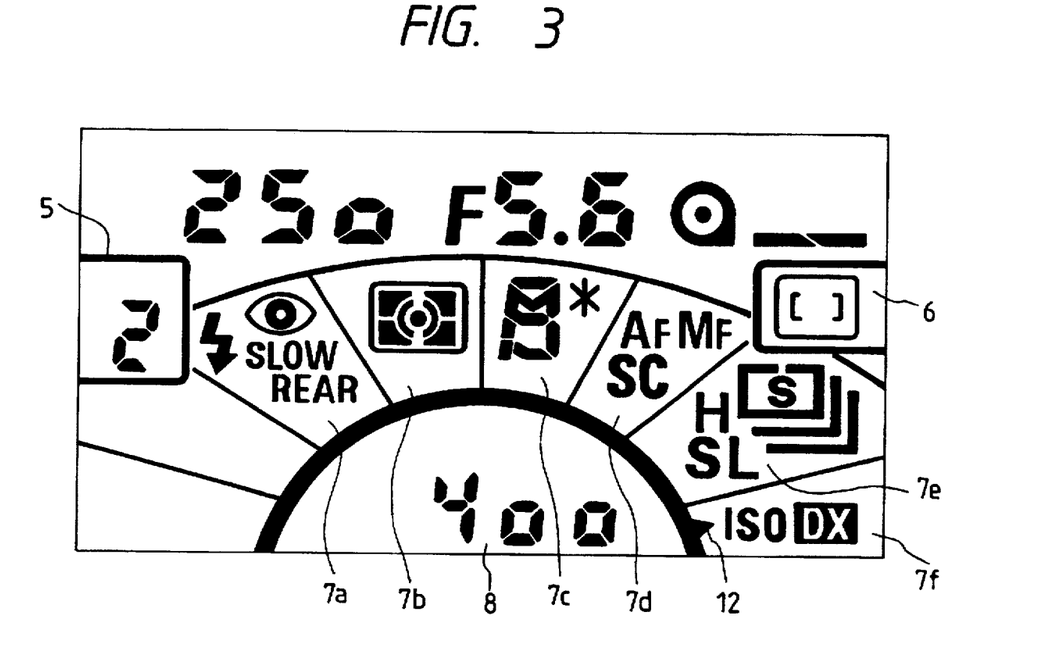
FIG. 3 is a diagram showing the state in which all the indications are lit up at the time of the function selection.

A first embodiment of the present invention will be described with reference to FIGS. 1 to 3. In FIG. 1, an operation section has operation buttons 1 to 4 and a display section 10 formed of an LCD device is divided into display areas 5 to 8. The operation buttons 1 to 4 correspond to the respective display areas 5 to 8. Therefore, for example, when the operation button 1 is depressed, the indications displayed on the area 5 become changeable. This change is carried out by means of an electronic dial. The shapes of the upper surfaces (surfaces to be checked visually) of the operation buttons 1 to 4 are identical to those of the respective upper surfaces of the display areas 5 to 8.

The operation buttons may be formed of plastics (mold), metal, sheet keys, etc. Thus, although the material and structure of the operation buttons may be selected suitably depending on the design of the camera, it is preferable to provide one operation button for each area in the display section 10.

The operation button 1 is a user custom set button and is a starting button for calling a menu selected by a user from menus (combinations of arbitrary functions) stored beforehand in storing means (not shown). The operation button 1 is set to have ten menus from 0 to 9. The menu 0 indicates the release of the user custom set. In the drawing, "2" is displayed on the area 5, which shows the state that the menu 2 is selected among ten menus from 0 to 9.

The operation button 2 is an AF switching button for switching two functions of spot AF (AF with a narrow metering range) and wide AF (AF with a wide metering range). In the drawing, the state in which the wide AF is selected is shown in the area 6.

The operation button 3 is a function selecting button to be depressed to select and change a function in one of menus (a combination of menus) of a user custom selected by the actuation of the operation button 1 as the user custom button and arranged in sub-divided areas. In this embodiment, the area 7 is subdivided into eight sub-areas and since the menu 2 is selected by the actuation of the operation button 2, six functions in the six respective sub-areas are shown in FIG. 2. The sub-area 7a is for flash control indication and three functions of the red-eye prevention, slow synchronization (the shutter speed is slowed down to synchronize the shutter and the flash) and trailing curtain synchronization are prepared therein. In FIG. 2, the red-eye prevention is set in the sub-division area 7a. The sub-area 7b is for metering mode indication, and three functions of the spot metering, center-weighted metering and multi-pattern metering are prepared therein. In FIG. 2, the multi-pattern metering is set. The area 7c is for exposure mode indication and there are five functions of P, S, A, M and P* are prepared therein. In FIG. 2, P (program) is set. The area 7d is for focus mode indication, and three functions of the AFS mode capable of depressing the shutter after the completion of the AF focusing operation, the AFC mode capable of depressing the shutter notwithstanding the completion of the AF focusing operation and the MF mode for the manual focusing operation. In FIG. 2, the AFS mode is set. The area 7e is for film feeding mode indication, and four functions of the single shot, high-speed successive shots, low-speed successive shots and silent feeding (silent mode) are provided therein. In FIG. 2, the single shot is set. The area 7f is for ISO setting indication, and two functions of DX for the ISO speed automatic reading and ISO for manually setting the speed in 31 stages from 6 to 6400. In FIG. 2, DX is displayed.

The operation button 4 is a set value and function selecting button for setting the set value and function of the selected function. "24" indicating the number of frames to be displayed after completing the selection of the set value and function of the selected function is displayed in the area 8 in FIG. 2. Although not operated directly by the operation members in the present invention, an upper area 11 displays exposure information of the camera (shutter speed, F-number) and a film loading condition. In FIG. 2, the shutter speed of 1/250 and the F-number of F5.6 are displayed.

Next, the operation of this embodiment will be described.

When a start switch of the camera is turned on, the above indications are lit up. Although not operated often usually, the operation button 1 which is the user custom set button, is depressed as required and the electronic dial 9 is operated by the user to call a desired menu among the menus from 0 to 9 stored in the storing means (not shown) and to display and set it on the area 5.

Similarly, when the operation button 2 which is the AF switching button, is depressed and the electronic dial 9 is operated, either of the two functions of the spot AF (AF with the narrow metering range) and the wide AF (AF with the wide metering range) is displayed and set on the area 6.

Next, the operation button 3 which is the function selecting button, is depressed. Upon the depression of the operation button 3, all function indications in each of the sub-areas 7a to 7f are lit up, as shown in FIG. 3. Further, the sub-area of the presently selected function, which is the function selected in the previous final selecting operation or the function determined by the default, is flickered and indicated by an index 12.

When changing the sub-area of the function, the electronic dial 9 is operated in this condition, whereby the flickering portion and the index 12 are moved along the sub-areas sequentially. This operation is possible while the operation button 3 is kept depressed. After the sub-area is selected, the depression of the operation button 3 is released. Thereby, the flickering portion is lit up and the functions other than the functions of this lit portion are switched off, making it possible to set a function of the lit portion.

When the operation button 4 is depressed after the setting of the function of the lit portion has become possible, the setting of the function of the lit sub-area becomes possible. Therefore, when the electronic dial 9 is operated with the operation button 4 depressed, a selected function and its set value and function are changed cyclically within the lit sub-area and the area 8. In FIG. 3, ISO setting indication is selected and "400" is displayed on the area 8. This operation is possible while the operation button 4 is kept depressed. In response to the index 12 indicating a sub-area of the area 7, the area 8 displays the values or functions of the functions set in the sub-area indicated by the index 12. Therefore, when the sub-area indicated by the index 12 is changed indications of the area 8 are changed also.

When the depression of the operation button 4 is released, the contents and set value displayed on the sub-area of the area 7 and the area 8 are set and the display section returns to the normal lighting condition. Also, the number of frames is displayed on the area 8.

The area 8 of the display section in the first embodiment of the present invention is constituted of a liquid crystal with a minute pattern (dot matrix liquid crystal) and the set value and function of each of the functions is displayed so as to be enlarged. Also, while the operation button 4 is depressed, the area 8 is kept to be usable. On the other hand, when the depression of the operation button 4 is released, the set value and set contents displayed on the area 8 are returned to the corresponding sub-area and the number of frames is displayed thereon. Also, the reason that the set value and set contents are returned and displayed on the corresponding sub-area is to check the condition of the set functions in the normal lighting condition.

Further, in the drawings showing the first embodiment, although only six sub-areas among the eight sub-areas are utilized, all eight sub-areas can be utilized as required.

Figure 4:
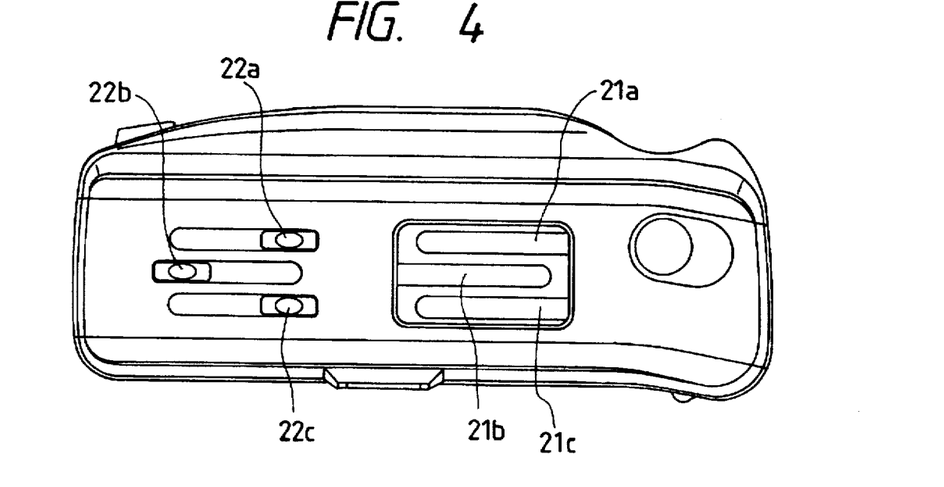
FIG. 4 is a top plan view of a camera according to a second embodiment of the present invention.

In FIG. 4 showing a second embodiment, an LCD section disposed on the upper surface of a camera body is divided into display areas 21a, 21b and 21c. Slide grooves are formed in an operation section on the upper surface of the camera body so as to be arranged the same as the display areas 21a to 21c. Slide levers 22a, 22b and 22c are provided slidably in the respective slide grooves. Also, in the second embodiment, the indication of the display area 21a is carried out by actuating the slide lever 22a, the indication of the display area 21b is carried out by actuating the slide lever 22b, and the indication of the display area 22c is carried out by actuating the slide lever 22c.

In this embodiment, the slide grooves are utilized, but projected slide guides may be utilized.

Figure 5:
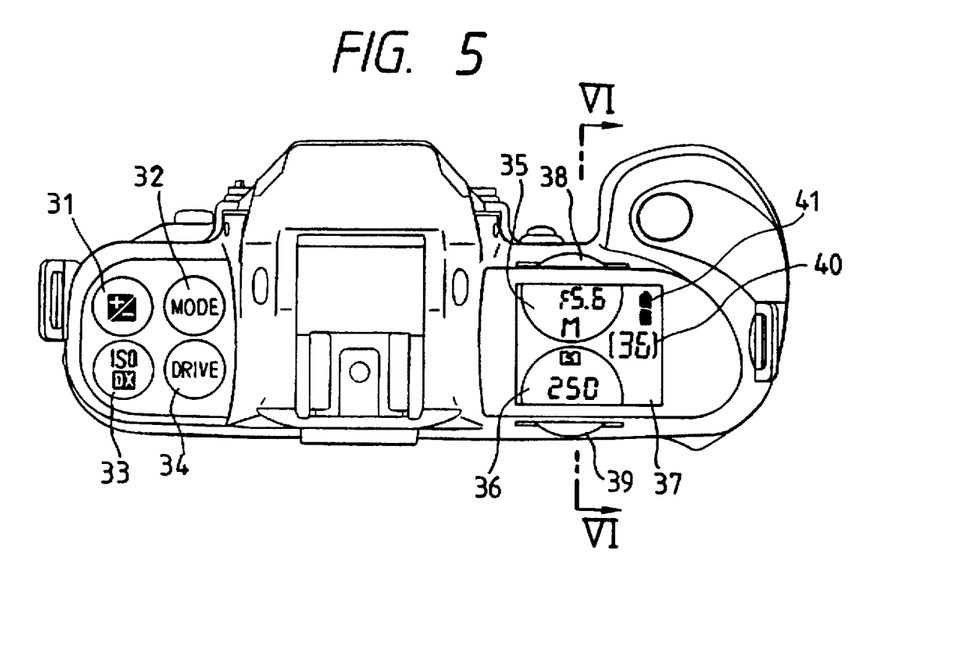
FIG. 5 is a top plan view of a camera according to a third embodiment of the present invention.
Figure 6:
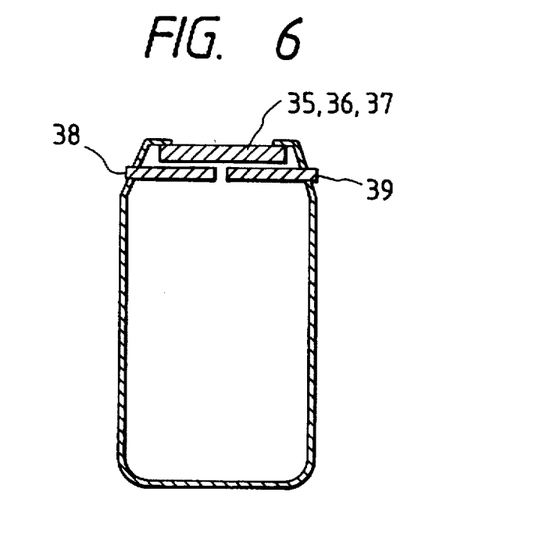
FIG. 6 is a cross-sectional view taken along VI—VI in FIG. 5, wherein the internal mechanisms are omitted.

FIGS. 5 to 8 show a third embodiment of the present invention. In FIG. 5, four buttons as first operating members, i.e., an exposure correcting button 31, an exposure mode selecting button 32, a film speed setting button 33 and a film feeding mode button 34 are disposed on the left side of an upper surface of a camera body. Also, an LCD device is disposed on the right side of the upper surface of the camera body. The LCD device is divided into a display area 35 for carrying out an exposure correcting indication, exposure mode indication and F-number indication, a display area 36 for carrying out a film speed indication, film feeding mode indication and shutter speed indication, and a display area 37 for carrying out indications of other necessary functions. The display area 35 is formed as if a portion of a circle were cut off by a straight line. As shown in FIG. 6, an electronic dial 38 is disposed under it as if to compensate for the cut-off portion. Also, the display area 36 is formed as if a portion of a circle were cut off by a straight line and an electronic dial 39 is provided under it as if to compensate for the cut-off portion. The electronic dials 38 and 39 constitute second operating members.

Figure 8:
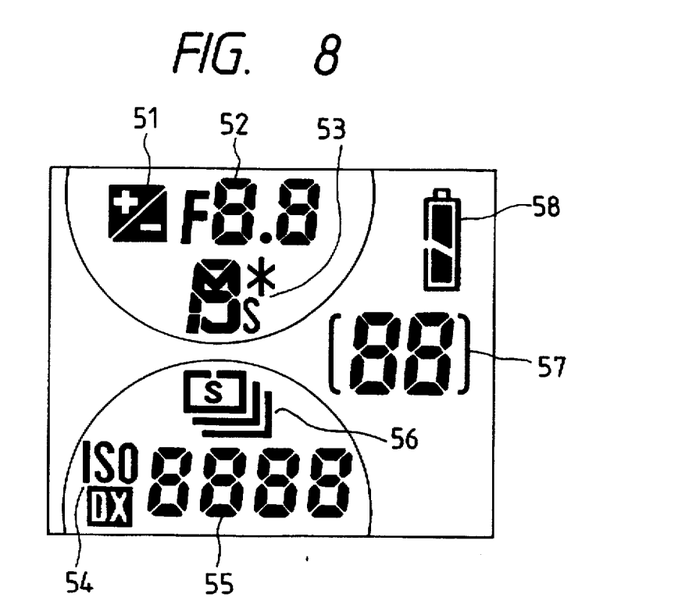
FIG. 8 is a diagram showing all the indications to be displayed on the display section of the third embodiment.

FIG. 8 shows all the indications to be displayed on the display section in this embodiment. A reference numeral 51 designates an indication for indicating the state of the exposure correction. A reference numeral 52 designates a seven-segment portion for carrying out the correction value indication at the time of the exposure correction or showing aperture information. A reference numeral 53 designates a portion for selectively displaying five exposure modes of P, S, A, M and P*. P is a program mode, S is a shutter-speed-priority mode, A is an aperture-priority mode, M is a manual mode, and P* is a program shift mode (the combination of the shutter speed and the F-number is changed by the photographer). A reference numeral 54 designates a portion for carrying out the film speed automatic reading DX indication or the manual ISO indication. A reference numeral 55 designates a seven-segment portion for displaying figures related to the manual ISO indication at the time of the ISO speed setting operation or shutter speed information. A reference numeral 56 designates a portion for carrying out the film feeding mode indication of a single shot or successive shots. A reference numeral 57 designates a seven-segment portion for displaying the number of frames. A reference numeral 58 designates a portion for the battery indication.

The operation of this embodiment will be described now.

When a start switch of the camera is turned on, the LCD device is lit up in the normal lighting condition as shown in FIG. 5.

When carrying out an exposure correction, the exposure correcting button 31 is depressed. Upon its depression, the display areas other than the display area 37 are switched off and the display area 35 becomes in an indication changeable condition and displays the exposure correction information only. In this condition, when the electronic dial 38 is rotated, the correction value can be changed in 31 stages in the range from −5.0 to +5.0. The correction value changed by the rotation of the electronic dial 38 is displayed on the seven-segment portion 52 of the display area 35 continuously. This operation is possible while the exposure correcting button 31 is depressed. Even when the depression of the exposure correcting button 31 is released, the indication 51 for indicating the exposure correction is left in the display area 35 as long as the selection of the exposure correction is not abandoned. However, the indication on the seven-segment portion 52 is changed from the correction value to the aperture information. At this time, the indications which were switched off during the exposure correction operation are lit up. Namely, the LCD device is returned to the normal lighting condition. Also, when the correction value is set to zero, the indication 51 is not displayed.

When carrying out an exposure mode selection, the exposure mode selecting button 32 is depressed. Thereby, the display areas other than the display area 37 are switched off in a similar manner to the exposure correction operation and the display area 35 is made to be in the indication changeable condition and displays the exposure mode only. When the electronic dial 38 is rotated in that condition, the aforementioned five modes (P, S, A, M, P*) can be switched continuously. As soon as the depression of the exposure mode selecting button 32 is released after the exposure mode has been selected, the indications which were switched off return to the normal lighting condition. The selected exposure mode is displayed on the display area 35. In FIG. 5, M is selected.

Figure 7:
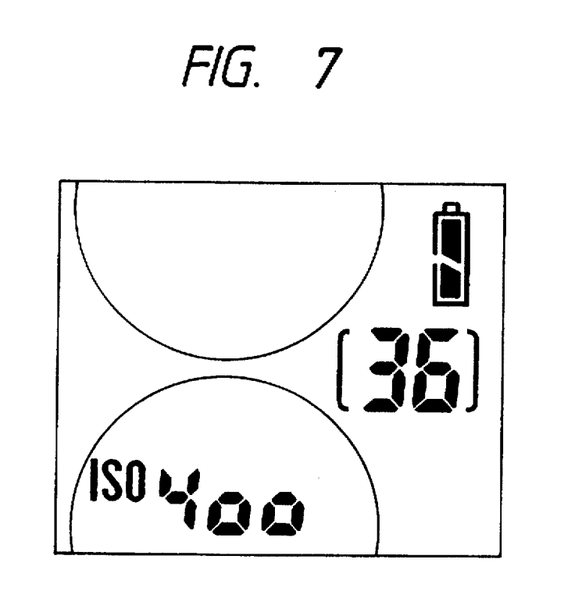
FIG. 7 is a diagram showing the state in which the set value of the manual ISO is selected.

When carrying out a film speed setting, the film speed setting button 33 is depressed. Thereby, the display areas other than the display area 37 are switched off and only the presently set contents of the film speed are displayed. When the electronic dial 39 is rotated in that condition, either of the film speed automatic reading and the set value of the manual ISO can be selected optionally. At this time, in the case of the film speed automatic reading, DX is displayed on the display area 36. On the other hand, in the case of the manual ISO, ISO is displayed on the display area 36 and its set value is displayed on the seven-segment portion 55. After the film speed setting has been completed, the depression of the film speed setting button 33 is released. After the release, when DX indicating the film speed automatic reading is displayed, the shutter speed is displayed on the seven-segment portion 55 instead of the film speed set value. Also, the other indications which were switched off are returned to the normal lighting condition. In FIG. 7, ISO and its set value are displayed.

When setting a film feeding mode, the film feeding button 34 is depressed. Thereby, the display areas other than the display area 37 are switched off the same as at the time of the film speed setting, and only the presently set film feeding mode is displayed on the display area 36. When the electronic dial 39 is rotated in that condition, two modes of the single shot and the successive shots can be switched alternately. In FIG. 5, the single shot mode is selected.

After the film feeding mode has been set, the depression of the film feeding mode button 34 is released. Thereby, the other indications are returned to the normal lighting condition.

Thus, in all the cases of the exposure correction, the exposure mode selection, the film speed setting and the film feeding mode setting, when the depression of the selecting button 31, 32, 33 or 34 is released, the unlit indications are returned to the normal lighting condition.

An indication 40 on the display area 37 indicates the number of frames and "36" is displayed in FIG. 5. Also, an indication 41 indicates a battery. The indications to be carried out by rotating the electronic dials 38 and 39 will not be displayed on the display area 37, and the indications on the display area 37 are carried out by another operating member. Also, the display area 37 is kept lit up constantly.

As described above, in the third embodiment of the present invention, since the selected display area is lit up and the other display areas are switched off, the setting contents can be displayed and checked promptly. Further, the first and second operating members are provided, and the second operation members and the display areas are arranged such that the respective second operation members and the display areas form predetermined shapes, so that their relationship can be found at a glance. Therefore, a lot of menus can be digested easily.

Figure 9:
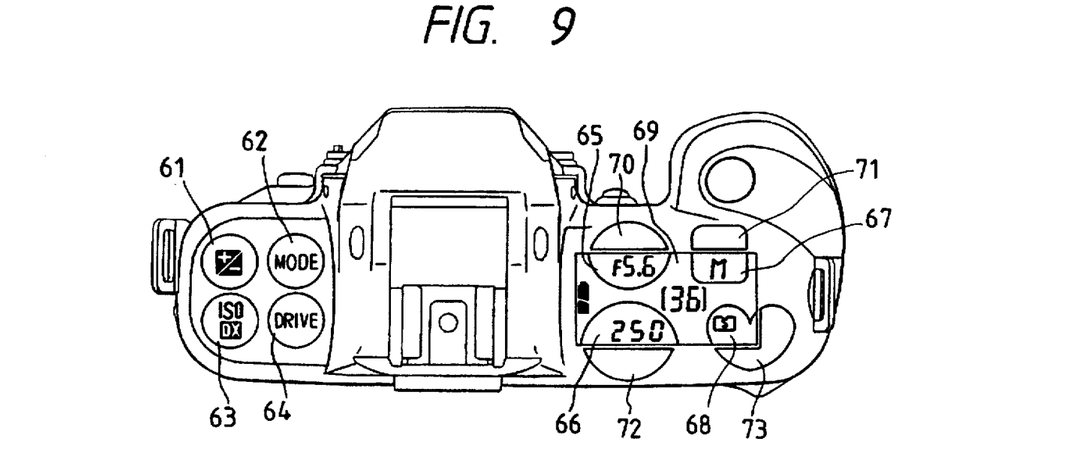
FIG. 9 is a top plan view of a camera according to a fourth embodiment of the present invention.

FIG. 9 is a top plan view of a camera according to a fourth embodiment of the present invention. In FIG. 9, four buttons as a first operating member, i.e., an exposure correcting button 61, an exposure mode selecting button 62, a film speed setting button 63 and a film feeding mode button 64 are provided on the left side of the upper surface of a camera body in a similar manner to the third embodiment. An LCD device is provided on the right side of the upper surface of the camera body. The LCD device is divided into a display area 65 for displaying the indications of the exposure correction and F-number, a display area 66 for displaying the indications of the film speed and the shutter speed, a display area 67 for displaying the indication of the exposure mode, and a display area 69 for displaying the indications of the battery and the number of frames.

The display area 65 is formed as if a portion of a circle were cut off by a straight line, and a set button 70 is disposed in the vicinity of the display area 65 as if to compensate for the cut-off portion. Also, in a similar manner to the display area 65, the display area 66 is formed as if a portion of a circle were cut off by a straight line, and a set button 72 is disposed in the vicinity of the display area 66 as if to compensate for the cut-off section. Further, the display area 67 is formed as if a portion of a square were cut off by a straight line, and a set button 71 is disposed in the vicinity of the display area 67 as if to compensate for the cut-off portion. The display area 68 is formed as if a portion of a heart were cut off by a straight line, and a set button 73 is disposed in the vicinity of the display area 68 as if to compensate for the cut-off portion. The set buttons 70 to 73 constitute a second operating member.

Figure 11:
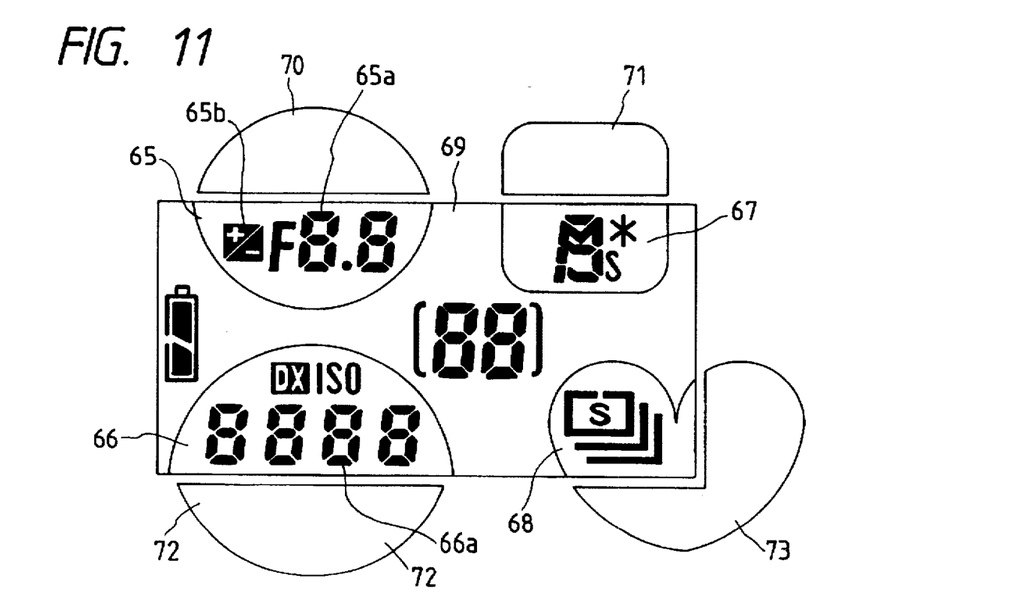
FIG. 11 is a diagram showing all the indications to be displayed on the display section of the fourth embodiment.

FIG. 11 shows all indications displayed on the display section of a fourth embodiment. The indications are the same as those in the third embodiment and the description thereof is omitted.

When a start switch of the camera is turned on, the LCD device is lit up to be a normal lighting condition.

When carrying out an exposure correction, the exposure correcting button 61 is depressed. Thereby, the display areas other than the display areas 65 and 69 are turned off, and the display area 65 is made to be in the indication changeable condition and displays exposure correction information only. When the set button 70 is depressed in that condition, the correction value can be changed in 31 steps in the range from −5.0 to +5.0. The correction value changed continuously by the set button 70 is displayed on a seven-segment portion 65a of the display area 65 and is continued while the exposure correcting button 61 is depressed. When the depression of the exposure correcting button 61 is released, an indication 65b for the exposure correction is displayed and the indication on the seven-segment portion 65a is returned to the aperture information from the correction value. Also, the other indications having been unlit return to be in the normal lighting condition. Further, when zero is selected as the correction value, the indication 65b will not be displayed.

When selecting an exposure mode, the exposure mode selecting button 62 is depressed. Thereby, the display areas other than the display areas 67 and 69 are switched off, and the display area 67 is made to be in the indication changeable condition and displays the exposure mode only. When the set button 71 is depressed in that condition, the abovementioned five modes (P, S, A, M, P*) can be switched continuously. When the selection of the exposure mode has been completed and the depression of the exposure mode selecting button 62 is released, the other indications which were switched off return to the normal lighting condition. At this time, the selected exposure mode is displayed on the display area 67. In FIG. 9, "M" is selected.

Figure 10:
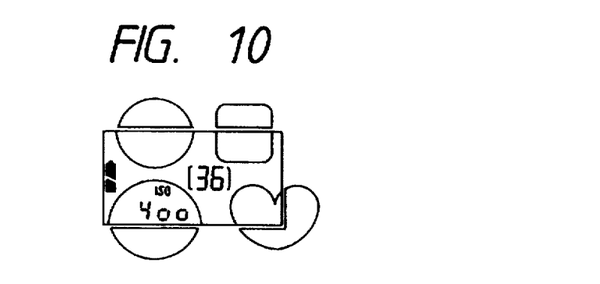
FIG. 10 is a diagram showing the state in which the set value "400" of the manual ISO is selected.

When carrying out film speed setting, the film speed setting button 63 is depressed. Thereby, the display areas other than the display areas 66 and 69 are switched off, and only the present indication of the film speed setting are displayed on the display area 66. When the set button 72 is depressed in that condition, the film speed automatic reading or the manual ISO and its set value can be selected optionally. At this time, in the case of the film speed automatic reading, "DX" is displayed on the display area 66 while in the case of the manual ISO, "ISO" is displayed on the display area 66 and its set value is displayed on a sevensegment portion 66a. Thus, when the film speed setting has been completed, the depression of the film speed setting button 63 is released. At the time of the release, when "DX" indicating the film speed automatic reading is displayed on, it is kept displayed and the shutter speed is displayed on the seven-segment portion 66a instead of the film speed set value. In FIG. 10, the set value "400" of the manual ISO is displayed.

When setting a film feeding mode, the film feeding mode button 64 is depressed. Thereby, the display areas other than the display areas 68 and 69 are switched off and the present indication of the film feeding mode is displayed on the display area 68 the same as at the time of the film speed setting. When the set button 73 is depressed in that condition, two modes of a single shot and successive shots can be switched alternately.

As described above, in all the cases of the exposure correction, the exposure mode selection, the film speed setting and film feeding mode setting, when the depression of the selecting button 61, 62, 63 or 64 is released, the unlit indications are returned to the normal lighting condition.

"36" indicating the number of frames is displayed on the display area 69 in FIG. 9. Also, a battery indication is displayed on the display area 69. The indications to be displayed by means of the set buttons 70 to 73 will not be displayed on the display area 69, and the indications on the display area 69 is carried out by another member. Also, the display area 69 is kept lit up constantly.

As described above, in the fourth embodiment of the present invention the same as in the third embodiment, since the selected display area is lit up and the other display areas are switched off, the setting contents can be displayed and checked promptly. Further, the first and second operating members are provided, and the second operation members and the display areas are arranged such that the respective second operation members and the display areas form predetermined shapes, so that their relationship can be found at a glance. Therefore, a lot of menus can be digested easily.

Having described preferred embodiments of the present invention, it is to be understood that many variations will occur to those skilled in the art within the scope of the appended claims.

What is claimed is:

1. A camera, comprising:
   a plurality of display areas forming an LCD device for displaying control contents of said camera, said display areas including at least two different shapes; and
   an operation section formed of operation members formed in said at least two different shapes, such that the shapes of said display areas respectively correspond to the shapes of corresponding ones of said operation members.

2. A camera according to claim 1, wherein said display areas have upper surfaces, and wherein said operation members are operation buttons having upper surfaces with shapes identical to the shapes of the respective upper surfaces of said display areas.

3. A camera according to claim 2, wherein said operation buttons include:
   a user custom set button for selecting one of a plurality of menus of a user custom,
   an AF switching button for switching AF functions,
   a function selecting button for selecting, when each of said menus of said user custom are subdivided into sub-menus, a desired function in each of said sub-menus of said selected menu, and
   a set value and function content selecting button for setting the set value and function of each of said selected functions.

4. A camera according to claim 2, wherein said display areas include:
   a user custom display area for displaying a selected one of a plurality of menus of a user custom,
   an AF function content display area for displaying one of AF function contents,
   a menu function display area for displaying, when each of said menus of said user custom are subdivided into sub-menus, functions of each of said sub-menus of said selected menu, and
   a set value and function content display area for displaying a set value and function content of a selected function.

5. A camera according to claim 1, wherein at least one of said display areas is subdivided to have a plurality of sub-areas.

6. A camera according to claim 5, wherein each of said sub-areas has a function and at least one of said display areas displays the functions of said sub-areas in an enlarged size.

7. A camera according to claim 5, wherein when setting a selected function in one of said sub-areas, said sub-area including said selected function is flickered.

8. A camera according to claim 5, wherein when setting a selected function in one of said sub-areas, said sub-area including said selected function is indicated by an index.

9. A camera according to claim 1, wherein each of said operating members comprises a slide groove and a slide lever disposed slidably in said slide groove, and the shapes of upper surfaces of said respective slide grooves are the same as the respective shapes of said display areas.

10. A camera comprising:
    a display device including first and second display areas having at least first and second different shapes, respectively; and
    an operation section including first and second operation members formed in the first and second different shapes, respectively, so that the first operation member is used to control a function which is displayed by said first display area and the second operation member is used to control a function displayed by said second display area.

* * * * *